United States Patent
Lu

(10) Patent No.: US 8,803,473 B2
(45) Date of Patent: Aug. 12, 2014

(54) PULSE MODULATION CHARGING METHOD AND APPARATUS

(75) Inventor: Chun-Yi Lu, Hsinchu County (TW)

(73) Assignee: Getac Technology Corporation, Hsinchu County (TW)

( * ) Notice: Subject to any disclaimer, the term of this patent is extended or adjusted under 35 U.S.C. 154(b) by 392 days.

(21) Appl. No.: 13/288,920

(22) Filed: Nov. 3, 2011

(65) Prior Publication Data

US 2013/0026976 A1 Jan. 31, 2013

(30) Foreign Application Priority Data

Jul. 26, 2011 (CN) .......................... 2011 1 0220085

(51) Int. Cl.
*H02J 7/00* (2006.01)
(52) U.S. Cl.
CPC .................................... *H02J 7/0093* (2013.01)
USPC ........................................................ 320/107
(58) Field of Classification Search
USPC ........................................................ 320/107
See application file for complete search history.

(56) References Cited

U.S. PATENT DOCUMENTS

| 4,746,852 A | 5/1988 | Martin |
| 5,481,174 A * | 1/1996 | Martin et al. .................. 320/129 |
| 5,726,551 A | 3/1998 | Miyazaki et al. |
| 2002/0050805 A1 * | 5/2002 | Petrovic ......................... 320/130 |
| 2003/0141845 A1 * | 7/2003 | Krieger et al. ................. 320/132 |
| 2007/0252558 A1 * | 11/2007 | Kawano et al. ............... 320/132 |

FOREIGN PATENT DOCUMENTS

| CN | 1088718 A | 6/1994 |
| CN | 2168340 Y | 6/1994 |
| TW | I285451 | 8/2007 |
| TW | M367511 | 10/2009 |

* cited by examiner

*Primary Examiner* — Arun Williams

(57) ABSTRACT

A pulse modulation charging method is provided for charging a rechargeable battery device. In the method, a current pulse is provided according to a charge-discharge cycle, the rechargeable battery device is charged repeatedly with a charge current pulse width, and the rechargeable battery device is discharged with a discharge current pulse width. In addition, in the method one or more voltage threshold values are further designated. When a terminal voltage of the rechargeable battery device is greater than the voltage threshold value, the charge current pulse width is gradually reduced, so as to improve charge efficiency for charging the rechargeable battery device. A pulse modulation charging apparatus is further provided, which is used for charging the rechargeable battery device according to the steps described here.

22 Claims, 5 Drawing Sheets

PULSE MODULATION CHARGING METHOD AND APPARATUS

BACKGROUND

1. Technical Field

This disclosure relates to charge of a rechargeable battery, and more particularly to a pulse modulation charging method and a pulse modulation charging apparatus, capable of charging a battery capacity close to saturation.

2. Related Art

Considering the charge requirement of a rechargeable battery, a charging method in the prior art uses a continuous and fixed current output to charge the rechargeable battery. However, continuously charging the rechargeable battery with a fixed current is likely to cause a polarization effect of battery electrodes, thereby forming impedance against a charge current and reducing charge efficiency.

In view of the above problems, many solutions are provided. For example, in U.S. Pat. No. 5,726,551 and U.S. Pat. No. 4,746,852, the continuous and fixed current output is modified to a pulse current output, so as to reduce the polarization effect of the electrodes. In Taiwan (R.O.C) Invention Patent No. I285451 and Taiwan (R.O.C) Utility Model Patent No. M367511, a discharge pulse is further added into the pulse current, so as to interfere crystallization of ions around the electrodes, thereby reinforcing an effect eliminating the polarization effect of the electrode.

The polarization effect affects the charge efficiency, and in addition, a battery capacity of the battery also changes the impedance against the charge current. Especially when the battery capacity is close to saturation, the impedance of the battery against the charge current is also increased. When the battery capacity exceeds a certain degree, a rate of the charge current is reduced significantly, and charge efficiency suddenly reduces sharply as a result. Consequently, if the battery capacity needs to be charged close to saturation, a charging operation takes a long time. Generally, a fast charge fails to charge the battery capacity close to saturation; instead, some of the battery capacity is sacrificed.

SUMMARY

In view of the problem in a battery charging method in the prior art that a polarization effect of a battery electrodes leads to poor battery charge efficiency, and it is difficult to charge a battery capacity close to saturation, this disclosure provides a pulse modulation charging method and a pulse modulation charging apparatus for improving charge efficiency and charging the battery capacity to a state close to saturation as much as possible.

This disclosure provides a pulse modulation charging method for charging a rechargeable battery device. In the method, a current pulse is provided according to a charge-discharge cycle to repeatedly charge and discharge a rechargeable battery device. In each charge-discharge cycle, the rechargeable battery device is charged with a charge current pulse width in the first place, and then the rechargeable battery device is discharged with a discharge current pulse width. The charge current pulse width is greater than the discharge current pulse width.

The method further includes setting a first voltage threshold value. When a terminal voltage of the rechargeable battery device is greater than the first voltage threshold value, the charge current pulse width is reduced to adjust a duty cycle of the charge-discharge cycle, so as to further repeatedly charge and discharge the rechargeable battery device.

This disclosure also provides a pulse modulation charging apparatus for charging a rechargeable battery device. The pulse modulation charging apparatus includes a pulse current generating module and a control module.

The pulse current generating module provides a current pulse to the rechargeable battery device according to a charge-discharge cycle. In each charge-discharge cycle, the pulse current generating module charges the rechargeable battery device with a charge current pulse width, and then discharges the rechargeable battery device with a discharge current pulse width. The charge current pulse width is greater than the discharge current pulse width.

The control module is set with a first voltage threshold value and continuously monitors a terminal voltage of the rechargeable battery device. When the terminal voltage is greater than the first voltage threshold value, the control module controls the pulse current generating module to reduce the charge current pulse width to adjust a duty cycle of the charge-discharge cycle, so as to charge and discharge the rechargeable battery device repeatedly.

The pulse modulation charging method and the pulse modulation charging apparatus of this disclosure reduce and eliminate an electrode polarization effect of electrodes of the rechargeable battery device, in which the electrode polarization effect is generated in the charge current pulse width through repeatedly charging and discharging the rechargeable battery device. Since the electrode polarization effect is reduced and eliminated, the charge efficiency is improved. Further, the charge current pulse width and the discharge current pulse width are changed along with a charge state, so that the rechargeable battery device remains in a good state to receive a charging current, thereby further improving charge efficiency and reducing the time required to charge the battery capacity of the rechargeable battery device close to saturation.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
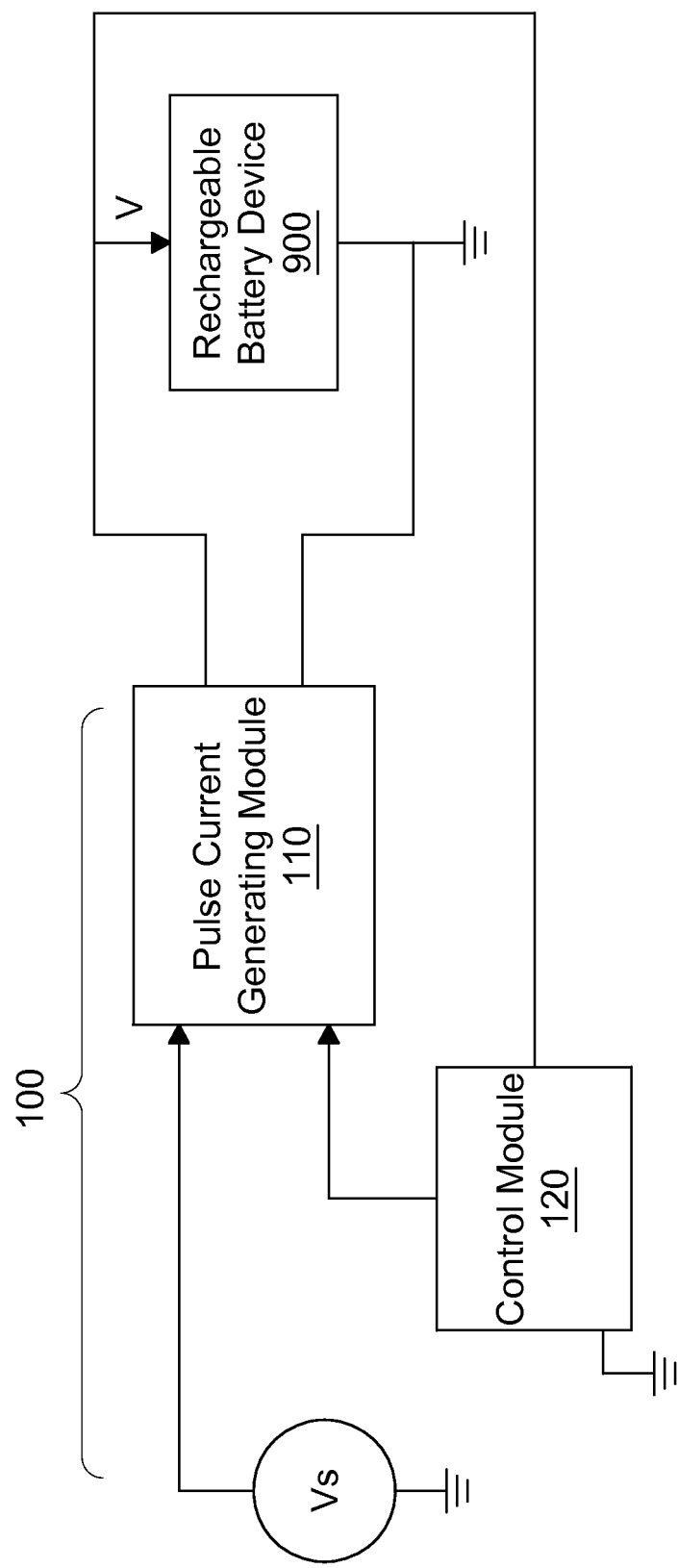
FIG. 1 is a circuit block diagram of a pulse modulation charging apparatus according to a first embodiment.
Figure 2:
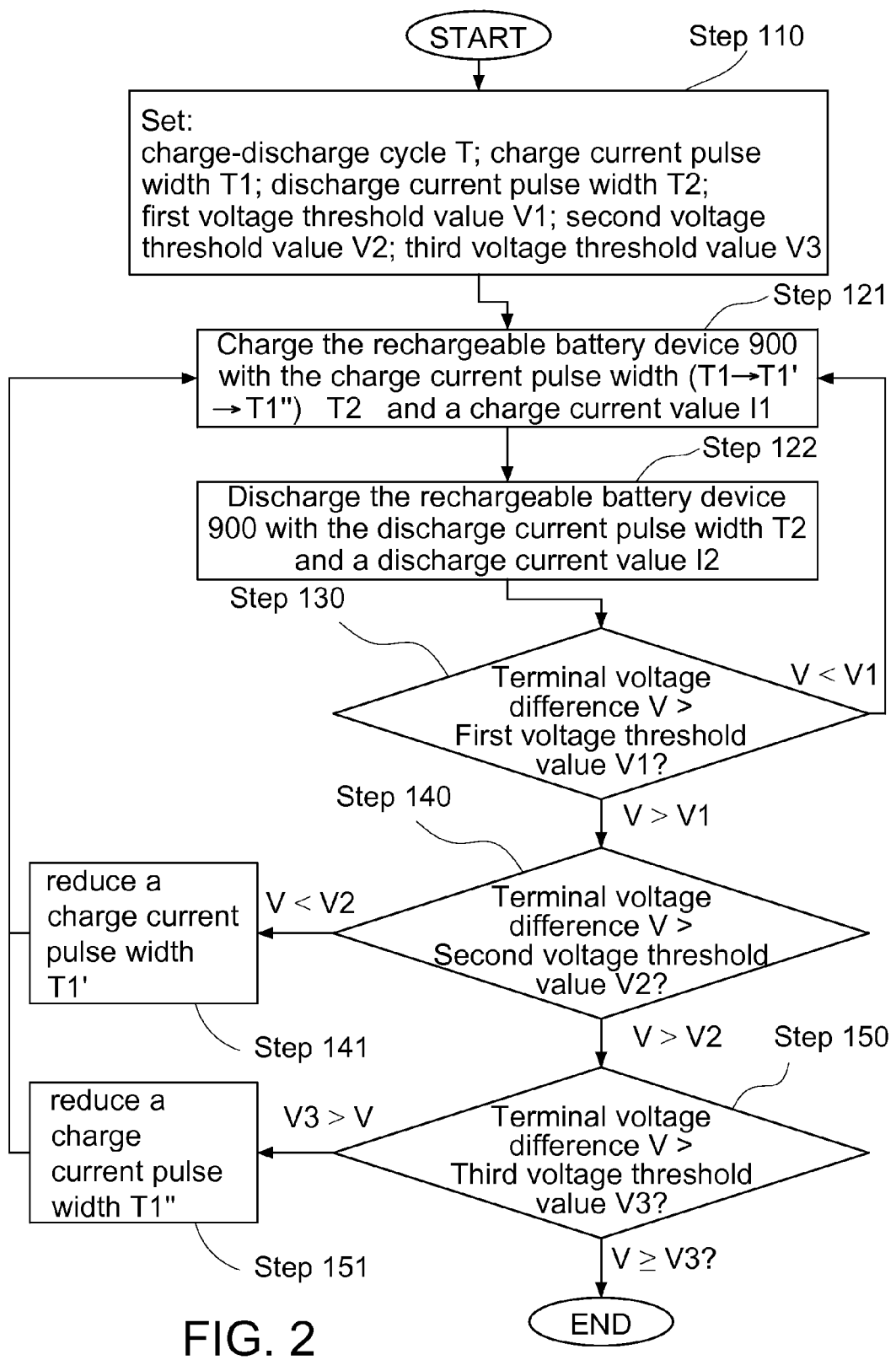
FIG. 2 is a flow chart of a pulse modulation charging method according to the first embodiment.

Referring to FIG. 1 and FIG. 2, a pulse modulation charging apparatus 100 and a pulse modulation charging method according to a first embodiment are illustrated. The pulse modulation charging apparatus 100 and the pulse modulation charging method are used to charge a rechargeable battery device 900. The pulse modulation charging apparatus 100 includes a pulse current generating module 110 and a control module 120.

As shown in FIG. 1 and FIG. 2, the pulse current generating module 110 obtains electric power from an electric power source Vs, and the pulse current generating module 110 is utilized for providing a current pulse to the rechargeable battery device 900 according to a charge-discharge cycle T. An example of the electric power source Vs is an alternating current (AC) power of 110 V to 220 V provided by a household socket; it is also possible that the electric power source Vs is a direct current (DC) power provided by another large-capacity battery or a rectifier. The control module 120 is utilized for controlling an output of the pulse current generating module 110 and continuously monitoring a terminal voltage V of the rechargeable battery device 900.

Referring to FIG. 1 and FIG. 2, when the pulse modulation charging method is performed by the pulse modulation charging apparatus 100, the rechargeable battery device 900 is connected to the pulse current generating module 110 in the first place. The charge-discharge cycle T is then set in the control module 120, and the charge-discharge cycle T at least has a charge current pulse width T1 and a discharge current pulse width T2, as shown in Step 110.

The charge current pulse width T1 is greater than the discharge current pulse width T2. In addition, a first voltage threshold value V1, a second voltage threshold value V2, and a third voltage threshold value V3 are further set in the control module 120, which are be compared with the terminal voltage V of the rechargeable battery device 900. The third voltage threshold value V3 is greater than the second voltage threshold value V2, and the second voltage threshold value V2 is greater than the first voltage threshold value V1.

Figure 3:
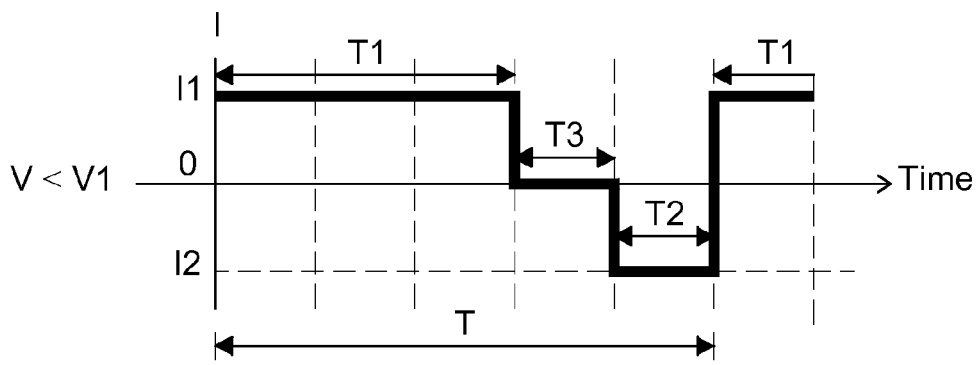
FIG. 3, FIG. 4, FIG. 5, and FIG. 6 are schematic views of a charge-discharge cycle according to the first embodiment.

As shown in FIG. 3, the control module 120 controls the pulse current generating module 110 according to a charge-discharge cycle T, so that the pulse current output device 110 provides a current pulse according to the charge-discharge cycle T. Therefore, the pulse current generating module 110 repeatedly charges and discharges the rechargeable battery device 900.

As shown in FIG. 1, FIG. 2, and FIG. 3, in each charge-discharge cycle T, the control module 120 executing the method controls the pulse current generating module 110 to execute the following steps.

In each charge-discharge cycle T, the pulse current generating module 110 charges the rechargeable battery device 900 with the charge current pulse width T1 and a charge current value I1, as shown in Step 121.

Then, after the charge current pulse width T1 is finished, the pulse current generating module 110 discharges the rechargeable battery device 900 with the discharge current pulse width T2 and a discharge current value I2, as shown in Step 122.

In order to ensure a battery capacity of the rechargeable battery device 900 after being charged is as close as possible to a saturated battery capacity of the rechargeable battery device 900, and in order to further improve the current reception state of the rechargeable battery device 900, in the first embodiment the control module 120 further executes the following step: adjusting the charge-discharge cycle T according to the first voltage threshold value V1, the second voltage threshold value V2, and the third voltage threshold value V3 set in the control module 120.

As shown in FIG. 1, FIG. 2, and FIG. 3, after each charge-discharge cycle T the control module 120 continuously determines whether the terminal voltage V of the rechargeable battery device 900 is greater than the first voltage threshold value V1, as shown in Step 130.

In Step 130, if the terminal voltage V of the rechargeable battery device 900 is not greater than the first voltage threshold value V1, the control module 120 returns to Step 121 and Step 122 and continues to control the pulse current generating module 110 to charge and discharge the rechargeable battery device 900 according to the charge-discharge cycle T.

In Step 130, if the terminal voltage V of the rechargeable battery device 900 is greater than the first voltage threshold value V1, the control module 120 further determines whether the terminal voltage V of the rechargeable battery device 900 is greater than the second voltage threshold value V2, as shown in Step 140.

Figure 4:
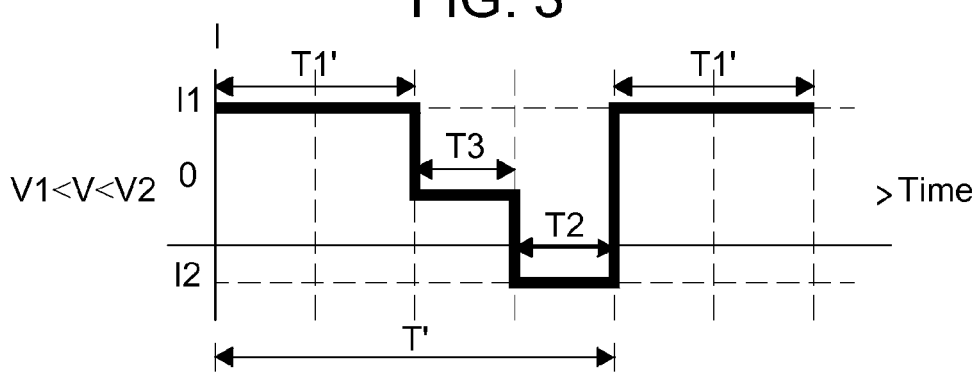

Referring to FIG. 1, FIG. 2, and FIG. 4, in Step 140 if the terminal voltage V of the rechargeable battery device 900 is not greater than the second voltage threshold value V2 (and is greater than the first voltage threshold value V1), the control module 120 controls the pulse current generating module 110 to reduce a charge current pulse width T1', so as to adjust a duty cycle of a charge-discharge cycle T', as shown in Step 141. Then the control module 120 returns to Step 121 and Step 122, and charges and discharges the rechargeable battery device 900 repeatedly according to the adjusted charge-discharge cycle T', as shown in Step 141.

In Step 140, if the terminal voltage V of the rechargeable battery device 900 is greater than the second voltage threshold value V2, the control module 120 determines whether the terminal voltage V of the rechargeable battery device 900 is greater than or equal to the third voltage threshold value V3, as shown in Step 150.

Figure 5:
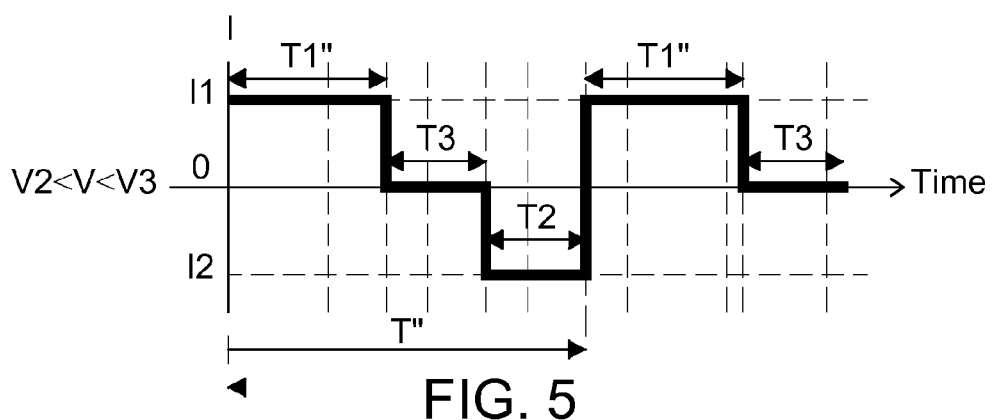

As shown in FIG. 1, FIG. 2, and FIG. 5, if the terminal voltage V of the rechargeable battery device 900 is greater than the second voltage threshold value V2 in Step 140 and the terminal voltage V is smaller than the third voltage threshold value V3 in Step 150, the control module 120 controls the pulse current generating module 110 to reduce a charge current pulse width T1", so as to adjust a duty cycle of the charge-discharge cycle T", as shown in Step 151.

Figure 6:

As shown in FIG. 1, FIG. 2, and FIG. 6, when the terminal voltage V of the rechargeable battery device 900 is greater than the second voltage threshold value V2 in Step 140 and the terminal voltage V is greater than or equal to the third voltage threshold value V3 in Step 150, the control module 120 controls the pulse current generating module 110 to stop charging or discharging the rechargeable battery device 900.

Referring to FIG. 3, FIG. 4, and FIG. 5, in one charge-discharge cycle T, an example of the charge current pulse width T1 and the discharge current pulse width T2 are seamlessly connected. Such a seamless connection results in an instant reversal of a current and a voltage applied on the rechargeable battery device 900; however, charge and discharge states in the rechargeable battery device 900 cannot be switched in time from a charge state to a discharge state in an instant.

Referring to FIG. 3, FIG. 4, and FIG. 5, in another example, each charge-discharge cycle T further includes a zero current width T3 arranged between the charge current pulse width T1 and the discharge current pulse width T2. In the zero current width T3, the pulse current generating module 110 does not apply a voltage difference on terminals of the rechargeable battery device 900, that is, a zero potential is outputted and no current is outputted for suspending charging and discharging of the rechargeable battery device 900.

An ideal arrangement of the charge current pulse width T1, the discharge current pulse width T2, and the zero current width T3 is that: the charge current pulse width T1 is not smaller than 0.6 times the cycle width of the charge-discharge cycle T, and is not greater than 0.8 times the cycle width of the charge-discharge cycle T. The discharge current pulse width T2 is not greater than 0.3 times the cycle width of the charge-discharge cycle T, and is greater than 0. The zero current width T3 is not greater than 0.4 times the cycle width of the charge-discharge cycle T, and is greater than 0; and preferably the zero current width T3 is 0.1 times the cycle width of the charge-discharge cycle T.

In the first embodiment, after being respectively determined according to the above ranges, the discharge current pulse width T2 and the zero current width T3 are set to be constants. At this time, each charge-discharge cycle T is a qualitative dependent variable and is varied along with adjustment of the charge current pulse width T1/T1'/T1". Moreover, the charge current pulse width T1 is gradually reduced as the terminal voltage V of the rechargeable battery device 900 is increased. It is noted that when setting values of T1, T2, and T3, T1 has to be greater than T2 to make sure that in each charge-discharge cycle T, the rechargeable battery device 900 is actually charged.

Figure 7:
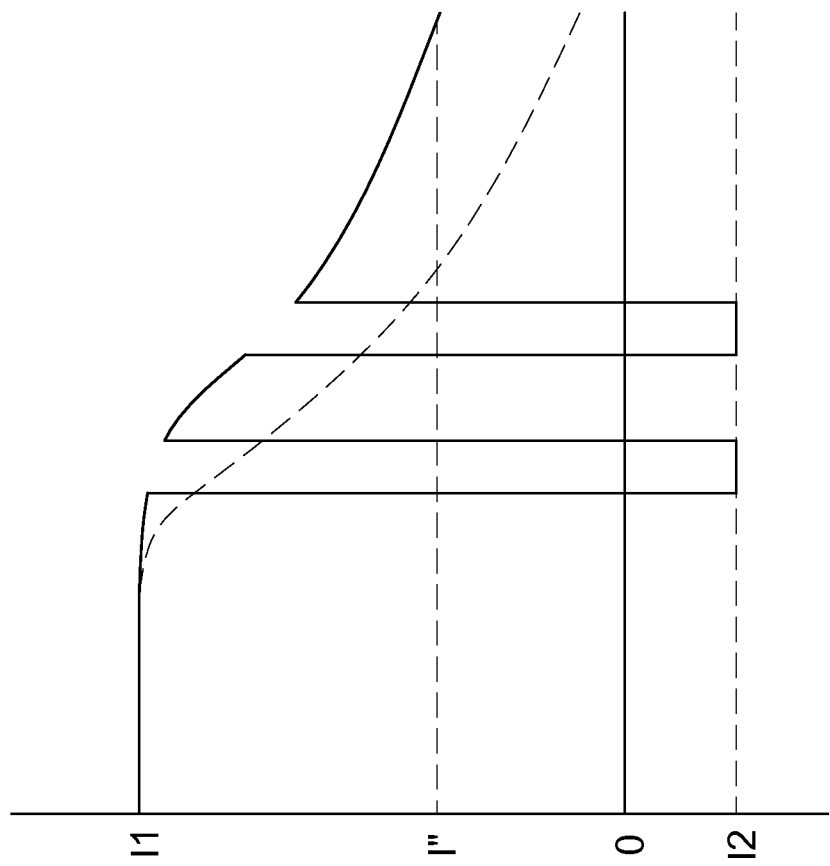
FIG. 7 is a schematic view of a charge current according to the first embodiment of the present invention.

As shown in FIG. 7, as electric power stored in the rechargeable battery device 900 is increased, input impedance of the rechargeable battery device 900 is also increased. Although the charge current value I1 shown in the FIG. 3 to FIG. 5 is represented by a constant, in each charge current pulse width T1/T1'/T1" the charge current value I1 for charging the rechargeable battery device 900 is reduced as time passes by, which makes the charge efficiency for charging the rechargeable battery device 900 poor as time passes by. However, in each discharge current pulse width T2, the discharge current value I2 of the rechargeable battery device 900 is set to be constant.

As shown in FIG. 7, when the rechargeable battery device 900 is charged for a certain time period, the charge current value I1 is quickly reduced. Dashed lines in FIG. 7 represent that in a charge process, the rechargeable battery device 900 is merely charged without being discharged. In such a case, the charge current value I1 is reduced significantly. If the proper discharge current value I2 is added for discharge as shown by solid lines, the reduction of the charge current value I1 may be delayed, and good charge efficiency is maintained in a later stage of power charging.

The charge efficiency is gradually reduced as a capacity saturation degree of the rechargeable battery device 900 is increased, demonstrating a phenomenon of a gradual reduce of the charge current value I1. Therefore, beside monitoring whether the terminal voltage V of a rechargeable battery is greater than or equal to the third voltage threshold value V3, the control module 120 also monitors the charge current value I1 to determine whether to stop charging and discharging.

In the first embodiment a current threshold rate I" is further set in the control module 120. When a current for charging the rechargeable battery device 900 is smaller than or equal to the current threshold rate I", the control module 120 controls the pulse current generating module 110 to stop outputting, so as to stop charging and discharging the rechargeable battery device 900.

An example of the current threshold rate I" is zero. However, it takes a long time period to charge if the charge current value I1 reaches zero, the current threshold rate I" that may be selected is 0.01 or 0.02 times a C-rate C (a.k.a. hourly rate) of the rechargeable battery device 900. A relationship between the current threshold rate I" and the C-rate C is represented in the following formula:

$$I''=0, \text{ or } 0.01C \geq I'' \geq 0.02C$$

Figure 8:
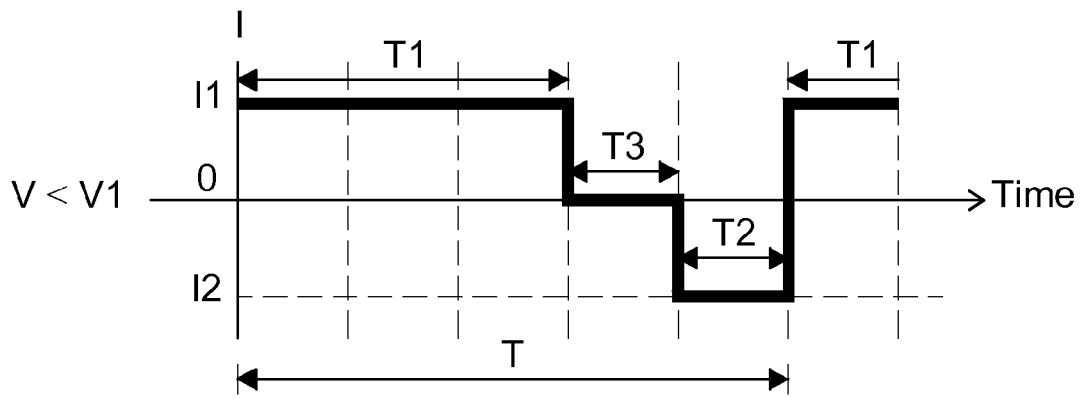
FIG. 8 and FIG. 9 are schematic views of a charge-discharge cycle according to a second embodiment.
Figure 9:
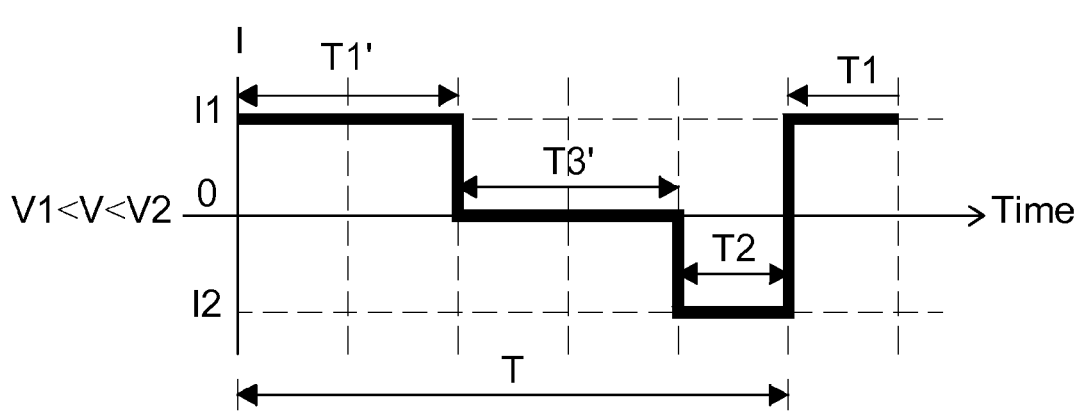

As shown in FIG. 8 and FIG. 9, in a second embodiment, the pulse modulation charging apparatus 100 and the pulse modulation charging method are approximately the same as those of the first embodiment, and a difference lies in that each charge-discharge cycle T is set to be constant in the second embodiment. A sum of a charge current pulse width T1 and a zero current width T3 is set to be constant. When a charge current pulse width T1' is reduced, a zero current width T3' is increased correspondingly, so that each charge-discharge cycle T remains a constant.

Figure 10:
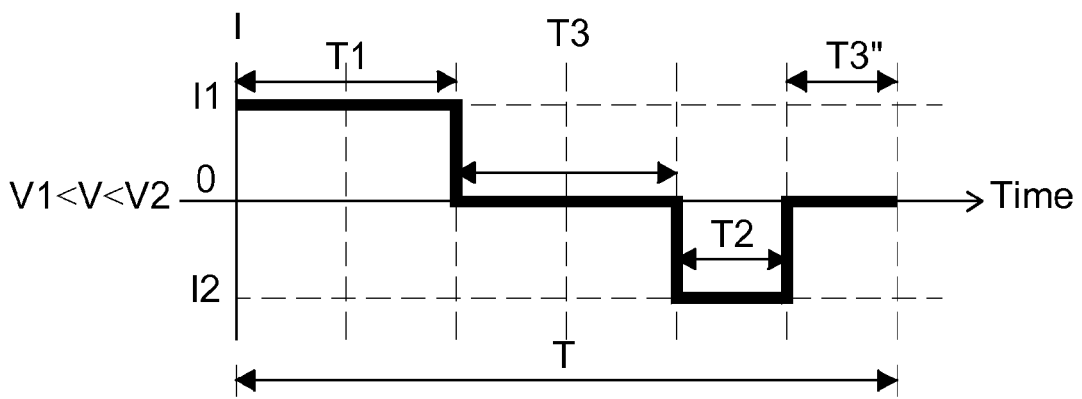
FIG. 10 is a schematic view of a charge-discharge cycle according to a third embodiment of the present invention.

As shown in FIG. 10, in a third embodiment, the pulse modulation charging apparatus 100 and the pulse modulation charging method are approximately the same as those of the first embodiment. The difference lies in that in the third embodiment, each charge-discharge cycle T further includes an secondary zero current width T3" following the discharge current pulse width T2 and is used to make a pulse current generating module 110 suspend charging and discharging the rechargeable battery device 900.

The secondary zero current width T3" is also used to prevent a seamless connection between a charge current pulse width T1 and a discharge current pulse width T2, thereby avoiding an instant reversal of a current and a voltage applied on the rechargeable battery device 900. The secondary zero current width T3" disclosed in the third embodiment may be applied in the first embodiment or the second embodiment according to the disclosure of the specification.

According to the disclosure an electrode polarization effect of electrodes of a rechargeable battery device 900 is eliminated, wherein the electrode polarization effect is generated in a charge current pulse width T1 through repeatedly charging and discharging the rechargeable battery device 900. Further, the charge current pulse width T1 and the discharge current pulse width T2 is changed along with a charge state, so that the rechargeable battery device 900 remains in a good state to receive a charging current, thereby reducing the time required to charge a battery capacity of the rechargeable battery device 900 close to saturation.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A pulse modulation charging method for charging a rechargeable battery device, comprising:
    setting a first voltage threshold value;
    providing a current pulse according to a first charge-discharge cycle, wherein the first charge-discharge cycle comprises a first charge current pulse width and a first discharge current pulse width for charging and discharging the rechargeable battery device, and the first charge current pulse width is greater than the first discharge current pulse width;
    repeatedly charging and discharging the rechargeable battery device according to the first charge-discharge cycle;
    adjusting the current pulse to a second charge-discharge cycle when the terminal voltage of the rechargeable battery device greater than the first voltage threshold value, wherein the second charge-discharge cycle comprises a second charge current pulse width and a second discharge current pulse width, and the second charge current pulse width is shorter than the first charge current pulse width; and
    repeatedly charging and discharging the rechargeable battery device according to the second charge-discharge cycle.

2. The pulse modulation charging method as claimed in claim 1, further comprising:

setting a second voltage threshold value greater than the first voltage threshold value; and adjusting the current pulse to a third charge-discharge cycle when the terminal voltage of the rechargeable battery device is greater than the second voltage threshold value, wherein the third charge-discharge cycle comprises a third charge current pulse width and a third discharge current pulse width, and the third charge current pulse width is shorter than the second charge current pulse width; and repeatedly charging and discharging the rechargeable battery device according to the third charge-discharge cycle.

3. The pulse modulation charging method as claimed in claim 2, further comprising:

setting a third voltage threshold value greater than the second voltage threshold value; and when the terminal voltage of the rechargeable battery device is greater than or equal to the third voltage threshold value, stopping charging and discharging the rechargeable battery device.

4. The pulse modulation charging method as claimed in claim 1, wherein each of the first and second charge-discharge cycles further comprises a zero current width, respectively arranged between the first and second charge current pulse widths and the first and second discharge current pulse widths, for suspending charging and discharging of the rechargeable battery device.

5. The pulse modulation charging method as claimed in claim 1, wherein the first charge-discharge cycle further comprises a first zero current width for suspending charging and discharging of the rechargeable battery device arranged between the first charge current pulse width and the first discharge current pulse width, and the second charge-discharge cycle further comprises a second zero current width for suspending charging and discharging of the rechargeable battery device arranged between the second charge current pulse width and the second discharge current pulse width; and wherein a sum of the first charge current pulse width and the first zero current width is equal to a sum of the second charge current pulse width and the second zero current width such that a cycle width of the first and second charge-discharge cycles is constant.

6. The pulse modulation charging method as claimed in claim 4, wherein a cycle width of the first and second charge-discharge cycles is a qualitative dependent variable which is varied along with adjustment of the first and second charge current pulse widths, and the first and second discharge current pulse widths and the zero current width are respectively constants.

7. The pulse modulation charging method as claimed in claim 1, wherein the first charge current pulse width is not smaller than 0.6 times the cycle width of the first charge-discharge cycle, and is not greater than 0.8 times the cycle width of the first charge-discharge cycle; and the first discharge current pulse width is not greater than 0.3 times the cycle width of the first charge-discharge cycle, and is greater than 0.

8. The pulse modulation charging method as claimed in claim 4, wherein the zero current width is not greater than 0.4 times the cycle width of the first charge-discharge cycle, and is greater than 0.

9. The pulse modulation charging method as claimed in claim 8, wherein the zero current width is 0.1 times the cycle width of the first charge-discharge cycle.

10. The pulse modulation charging method as claimed in claim 9, further comprising setting a current threshold rate, and stopping charging and discharging the rechargeable battery device when a current rate for charging the rechargeable battery device is smaller than or equal to the current threshold rate.

11. The pulse modulation charging method as claimed in claim 10, wherein the current threshold rate is zero, or 0.01 to 0.02 times a C-rate of the rechargeable battery device.

12. The pulse modulation charging method as claimed in claim 4, wherein each of the first and second charge-discharge cycles further comprises a secondary zero current width respectively following the first and second discharge current pulse widths, for suspending charging and discharging of the rechargeable battery device.

13. The pulse modulation charging method as claimed in claim 1, wherein a discharge current for discharging the rechargeable battery device in the first and second discharge current pulse widths is set to be constant.

14. A pulse modulation charging apparatus for charging a rechargeable battery device, comprising:

a pulse current generating module, for providing a current pulse to the rechargeable battery device; and a control module, set with a first voltage threshold value, and configured to continuously monitor a terminal voltage of the rechargeable battery device;

wherein the control module is configured to initially control the pulse generating module to repeatedly charge and discharge the rechargeable battery device according to a first charge-discharge cycle, and when the terminal voltage is greater than the first voltage threshold value, to control the pulse current generating module to repeatedly charge and discharge the rechargeable battery device according to a second charge-discharge cycle;

wherein the first charge-discharge cycle comprises a first charge current pulse width and a first discharge current pulse width, the first charge current pulse width being greater than the first discharge current pulse width, and the second charge-discharge cycle comprises a second charge current pulse width and a second discharge current pulse width, the second charge current pulse width being shorter than the first charge current pulse width.

15. The pulse modulation charging apparatus as claimed in claim 14, wherein the control module is further set with a second voltage threshold value greater than the first voltage threshold value; and the control module is configured to control the pulse generating module to repeatedly charge and discharge the rechargeable battery device according to a third charge-discharge cycle when the terminal voltage is greater than the second voltage threshold value, wherein the third charge-discharge cycle comprises a third charge current pulse width and a third discharge current pulse width, the third charge current pulse width being shorter than the second charge current pulse width.

16. The pulse modulation charging apparatus as claimed in claim 15, wherein the control module is further set with a third voltage threshold value greater than the second voltage threshold value; and the control module is configured to control the pulse current generating module to stop charging and discharging the rechargeable battery device when the terminal voltage is greater than or equal to the third voltage threshold value.

17. The pulse modulation charging apparatus as claimed in claim 14, wherein each of the first and second charge-discharge cycles further comprises a zero current width, respectively arranged between the first and second charge current pulse widths and the first and second discharge current pulse widths, for suspending charging and discharging of the rechargeable battery device.

18. The pulse modulation charging apparatus as claimed in claim 14, wherein the first charge-discharge cycle further comprises a first zero current width for suspending charging and discharging of the rechargeable battery device arranged between the first charge current pulse width and the first discharge current pulse width, and the second charge-discharge cycle further comprises a second zero current width for suspending charging and discharging of the rechargeable battery device arranged between the second charge current pulse width and the second discharge current pulse width; and wherein a sum of the first charge current pulse width and the first zero current width is equal to a sum of the second charge current pulse width and the second zero current width such that a cycle width of the first and second charge-discharge cycles.

19. The pulse modulation charging apparatus as claimed in claim 17, wherein a cycle width of the first and second charge-discharge cycles is a qualitative dependent variable which is varied along with adjustment of the first and second charge current pulse widths, and the first and second discharge current pulse widths and the zero current width are respectively constants.

20. The pulse modulation charging apparatus as claimed in claim 17, wherein the control module is further set with a current threshold rate; and the control module is configured to control the pulse current generating module to stop charging and discharging the rechargeable battery device when a current rate for charging the rechargeable battery device is smaller than or equal to the current threshold rate.

21. The pulse modulation charging method as claimed in claim 1, wherein the first and second discharge current pulse widths are equal.

22. The pulse modulation charging method as claimed in claim 14, wherein the first and second discharge current pulse widths are equal.

* * * * *